(12) United States Patent
Mokhadkar et al.

(10) Patent No.: US 10,298,081 B2
(45) Date of Patent: May 21, 2019

(54) SEPARATOR FOR SEPARATING WINDINGS

(71) Applicant: Cummins Generator Technologies Limited, Peterborough (GB)

(72) Inventors: Rahul Prakash Mokhadkar, Stamford (GB); Gareth Gilson, Stamford (GB); Tom Ede, Stamford (GB); Dave Worthington, Stamford (GB); Mark Riches, Stamford (GB); Richard Clark, Stamford (GB); Chris Gutteridge, Stamford (GB); Philip David Bend, Grantham (GB)

(73) Assignee: Cummins Generator Technologies Limited, Peterborough (GB)

( * ) Notice: Subject to any disclaimer, the term of this patent is extended or adjusted under 35 U.S.C. 154(b) by 402 days.

(21) Appl. No.: 14/907,115

(22) PCT Filed: Jul. 25, 2014

(86) PCT No.: PCT/GB2014/052284
§ 371 (c)(1),
(2) Date: Jan. 22, 2016

(87) PCT Pub. No.: WO2015/011492
PCT Pub. Date: Jan. 29, 2015

(65) Prior Publication Data
US 2016/0156237 A1    Jun. 2, 2016

(30) Foreign Application Priority Data
Jul. 26, 2013    (GB) .................................. 1313334.3

(51) Int. Cl.
*H02K 3/24*    (2006.01)
*H02K 3/38*    (2006.01)

(52) U.S. Cl.
CPC ................ *H02K 3/24* (2013.01); *H02K 3/38* (2013.01)

(58) Field of Classification Search
CPC .................................... H02K 3/24; H02K 3/38
USPC ........................................................... 310/58
See application file for complete search history.

(56) References Cited

U.S. PATENT DOCUMENTS

| 3,219,857 A | 11/1965 | Fisher |
| 4,922,165 A | 5/1990 | Crawford et al. |
| 2011/0148244 A1 | 6/2011 | Bliemeister et al. |

(Continued)

FOREIGN PATENT DOCUMENTS

| DE | 102012204197 | * 9/2013 | ............... H02K 1/32 |
| EP | 1 865 588 | 12/2007 | |
| GB | 2 088 648 | 6/1982 | |

(Continued)

OTHER PUBLICATIONS

United Kingdom Search Report for United Kingdom Patent Application No. GB1313334.3, dated Jan. 27, 2014, 1 page.

(Continued)

*Primary Examiner* — Alex W Mok
(74) *Attorney, Agent, or Firm* — Foley & Lardner LLP

(57) ABSTRACT

A separator (10, 60, 65, 100) is disclosed for electrically separating groups of end windings (52) in the stator of a rotating electrical machine. The separator is arranged to provide circumferential air channels (24, 74, 85) through the windings. This can allow air flow to be delivered to inside the windings, thereby cooling the windings more effectively.

25 Claims, 9 Drawing Sheets

(56) References Cited

U.S. PATENT DOCUMENTS

2013/0162095 A1\* 6/2013 Modi .................... H02K 3/522
310/195

FOREIGN PATENT DOCUMENTS

| JP | H04-17539 | 1/1992 |
|---|---|---|
| WO | WO 2011/087618 | 7/2011 |

OTHER PUBLICATIONS

PCT Search Report and Written Opinion for PCT/GB2014/052284, dated Jul. 20, 2015, 9 pages.

\* cited by examiner

SEPARATOR FOR SEPARATING WINDINGS

CROSS-REFERENCE TO RELATED APPLICATIONS

The present application is a U.S. national stage application claiming the benefit of International Application No. PCT/GB2014/052284, filed on Jul. 25, 2014, which claims priority from British Patent Application No. GB1313334.3 filed Jul. 26, 2013, the entire contents of which are incorporated herein by reference in their entirety.

The present invention relates to a separator for separating end windings in the stator of an electrical machine.

The stator of an electrical machine usually comprises slots which hold stator windings. The windings may be wound in the slots in situ, or else pre-formed coils may be inserted into the slots. In either case, it is usually necessary for the windings to exit one slot and pass around the outside of the stator before entering another slot. The parts of the windings which extend outside of the stator are usually referred to as end windings or overhang windings.

In a multi-phase electrical machine, the stator windings include separate groups of windings for each phase. This may result in the end windings of different phases lying adjacent to each other. In operation, each of the phases is at a different electrical potential.

In a rotating electrical machine the stator normally acts as the armature and carries the main electrical power. Since the end windings of different phases may lie adjacent to each other, considerable electrical potential may be present between the phases. It is therefore necessary to ensure sufficient electrical insulation between the end windings of different phases.

The individual wires in the stator windings are usually electrically insulated by means of an outer insulation layer, which is typically enamel. However faults may develop in the outer insulation layer either due to the manufacturing process, or due to stresses imposed on the wires during construction or use of an insertion tool. In the case of windings at different electrical potentials, this could lead to arcing between the windings. This would make the machine inefficient and could lead to the machine being damaged and ultimately machine failure.

Known techniques for electrically insulating end windings of different phases have involved inserting insulating barriers, such as composite sheets of meta-aramid material and/or polyester, between the groups of end windings, or substantially increasing the thickness of the enamel coating on the wires.

The power rating of an electrical machine is often limited by the temperature rise of the stator and rotor when the machine is in use. Furthermore, machines generally operate more efficiently at lower temperatures. Thus many machines are arranged to have air flow through the machine, in order to cool the machine.

However, if insulating paper is placed between adjacent groups of windings, this may restrict the air flow through the windings and thus reduce the cooling efficiency. Furthermore the paper may become damaged or dislodged, particularly in the case of end windings where it may be more exposed.

If on the other hand the thickness of the enamel coating on the wires is increased, this reduces the amount of copper for a given size of machine, and thus reduces the power rating of the machine.

EP 1 865 588 A1 in the name of the present applicant, the subject matter of which is incorporated herein by reference, discloses a separator for providing an electrically insulating layer between groups of windings in an electrical apparatus, such as a rotating electrical machine. The separator comprises a matrix of interconnected rods. This can allow air gaps to be present between groups of windings, which can improve the cooling efficiency of the machine.

WO 2001/087618 discloses a technique for separating end windings in a stator assembly. The technique involves inserting electrically insulating sheets between adjacent end turns of different phases. The sheets are held in place by cords which are wrapped around the end turns. Phase separators are inserted between the adjacent end turns once the sheets are in place. The phase separators have a head portion and an elongate body portion, and are driven between the end coils by force.

The techniques for separating end windings disclosed in EP 1 865 588 and WO 2001/087618 can allow air to flow radially through the windings. However it has been found that air flow may not be delivered consistently to all parts of the windings. For example, there may be less air flow through the inner parts of the windings, which may also be where the highest temperatures are encountered.

Furthermore, the arrangement of WO 2001/087618 involves a rather cumbersome assembly process, and the need to drive phase separators between the end turns could potentially damage the outer insulation layer of the individual wires. In addition, the electrically insulating sheets may restrict air flow between the end turns. On the other hand, holes in the paper may limit the electrical separation of the phases.

According to one aspect of the present invention there is provided a separator for separating groups of end windings in the stator of a rotating electrical machine, wherein the separator is arranged to provide a circumferential air channel through the windings.

The present invention may provide the advantage that, by arranging the separator to provide a circumferential air channel through the windings, air flow may be delivered to inner parts of the windings. This may allow more consistent cooling of the windings.

The circumferential air channel may be an air channel, which, when the separator is in place between two groups of windings, runs at least partially in a circumferential direction, or has a major component in a circumferential direction. However the direction of the air channel may also have other components, such as a radial component and/or an axial component.

Preferably at least a portion of the separator is substantially planar, and the circumferential air channels are arranged in the plane of the separator (or the portion of the separator which is substantially planar). This may allow air flow to be delivered to parts of the windings which might not otherwise be reached.

The separator may comprise a substantially planar layer with a plurality of upright elements. For example, a single planar layer may be provided, and the upright elements may protrude out of the plane of the planar layer. Alternatively a top and a bottom planar layer may be provided with an air gap in between, in which case the upright elements may extend between the top and bottom planar layers. The upright elements may be, for example, ribs or posts.

The upright elements may function to hold apart adjacent groups of windings. Thus the upright members may help to ensure sufficient electrical separation between two groups of windings, by maintaining an air gap between them. The size of the air gap is preferably chosen to provide a sufficient electrical separation based on the breakdown strength of air.

Preferably the circumferential air channel is provided between the upright elements. Thus the upright elements may provide the dual function of holding apart adjacent groups of windings, and providing circumferential air channels through the windings.

The separator may comprise a plurality of circumferential air channels. This may help with cooling while helping to maintain the desired separation between adjacent groups of windings.

The separator is preferably configured to sit between two groups of end windings in the stator of a rotating electrical machine. Preferably the separator is arranged to deliver air flow to an area between two groups of windings which would not otherwise be exposed, such as an inner part of the windings. This may allow better and more consistent cooling of the windings to be achieved.

Preferably the separator comprises at least one opening between the circumferential air channel and the windings. For example the air channel may be open, or it may have holes. This can allow air flow which passes through the circumferential air channel to be delivered to the windings, thereby facilitating cooling of the windings.

Preferably the separator is arranged to allow radial air flow through the windings. This may be achieved by providing air paths through the plane of the separator. For example, the separator may comprise holes or openings which pass from one side of the separator to the other. This may help with cooling of the windings, by providing radial paths for air flow through the windings.

The separator may be arranged to extend along substantially the length of a group of windings. For example, the separator may be arranged to extend from an area close to where the windings exit stator slots to an area close to where the windings enter stator slots. This can help to ensure that the windings are separated at all points. Furthermore, air flow may be delivered more evenly across the windings, thereby achieving more effective and consistent cooling of the windings.

In one embodiment, the separator comprises a top layer and a bottom layer separated by an air gap. This may help to maintain a sufficient separation between adjacent groups of windings. Preferably the circumferential air channel is between the top layer and the bottom layer.

At least one of the top layer and the bottom layer may comprise means for supporting a group of windings. The means for supporting a group of windings may be arranged to reduce or prevent droop of the windings into the circumferential air channel. This may help to ensure that the required separation between groups of windings is maintained.

The means for supporting a group of windings may comprise a series of planar elements. This may allow the windings to be supported, while gaps or openings between the planar elements may allow radial air flow through the separator and/or air flow from the circumferential air passage to be delivered to the windings.

The series of planar elements may be, for example, a series of beams. The beams may run in a direction different to the direction of the windings. For example, the beams may run in a direction which is substantially perpendicular to that of the windings. This may help to prevent the windings from drooping into the air channel.

Preferably parts of the top layer are staggered with respect to parts of the bottom layer. For example, wherein the means for supporting a group of windings in one layer comprises a series of planar elements, these may be staggered with respect to corresponding parts in the other layer. For example, a part of one layer (e.g. a planar element) may be located opposite an opening in the other layer.

By staggering parts of the top layer with respect to parts of the bottom layer, the possibility of a winding pressing through the separator may be minimised. However, radial air flow through the separator may be achieved by virtue of openings in the layers. Furthermore, circumferential air flow through the separator may reach the insides of the windings though the openings. In addition, by staggering parts of the top layer with respect to parts of the bottom layer, the creepage distance of the separator may be improved.

Preferably the separator further comprises means for separating the top layer and the bottom layer. The means for separating the top layer and the bottom layer may comprise upright elements, such as ribs or posts.

The means for separating may be offset from the edge of a planar element for supporting a group of windings. This may help to maximise the creepage distance of the separator.

The separator may further comprise a sloping portion between the top layer and the bottom layer. This may help with insertion of the separator between groups of windings, since the sloping portion may help to urge apart adjacent groups of windings. The sloping portion may comprise at least one slit. This may provide some flexibility to the separator, which may help when inserting the separator into the windings.

The separator may comprise an area in which only one of the top layer and the bottom layer is provided. This area may be located where physical support is desired for one group of windings, but where there is no other group of windings immediately adjacent (and thus electrical separation is not required). This area may also help to keep the separator in place between the windings. This area may comprise at least one hole, and preferably a plurality of holes, which may allow radial air flow through the windings.

Alternatively or in addition the separator may comprise a cut out area. The cut out area may be located where there are no adjacent groups of windings when the separator is in place.

In another embodiment of the invention the separator comprises a planar portion and a curved portion. The planar portion may comprise a plurality of ribs and a plurality of air holes therebetween.

This embodiment may also be provided independently, and thus according to another aspect of the present invention there is provided a separator for separating end windings in the stator of an electrical machine, the separator comprising a planar portion and a curved portion, wherein the planar portion comprises a plurality of ribs and a plurality of air holes therebetween.

This embodiment may provide the advantage that the separator is easily inserted between end windings, and can provide the necessary electrical separation between the windings while at the same time allowing them to be exposed to air. Furthermore, providing a curved portion may help to ensure that the separator remains securely in place, as well as providing electrical separation across at least part of the outside surface of the end windings.

Preferably the curved portion curves in a direction away from the plane of the planar portion. For example, the planar portion may be substantially tangential to the curved portion. This can help to provide an arrangement in which the separator provides electrical separator across at least part of the outside surface of the end windings.

Preferably the curved portion is arranged at least partially to conform to the shape of the end windings. For example, end windings in a stator are typically arranged in groups, with each group corresponding to one electrical phase. Thus the curved portion may be arranged such that, in use, it curves around a group of end windings.

In one arrangement, the air holes in the planar portion are arranged in a grid pattern, although other arrangements could also be used. The air holes in the planar portion can allow air to pass through the plane of the separator, and thus allow air to flow to the windings. In operation, this air flow may be in a substantially radial direction through the machine, and thus the air holes may function as radial ducts.

Preferably the curved portion comprises air holes. The air holes in the curved portion may allow axial air flow, and allow direct air impingement on the stator end windings.

Preferably the ribs are provided on an outer surface of the planar portion. The outer surface of the planar portion preferably corresponds to a convex surface of the curved portion. The ribs may be used to ensure sufficient separation between adjacent windings and/or to provide air channels through the windings.

Preferably at least some of the ribs define air channels through the separator, the air channels preferably running in or parallel to the plane of the planar portion. This can assist with cooling of the machine.

Preferably at least some of the ribs run in a direction which is substantially parallel to that of the end windings. Since the end windings of a stator typically run in a substantially circumferential direction around the machine, this may provide a circumferential path for air to flow around the end windings, which can assist in cooling the machine. Thus at least some of the ribs may provide a circumferential air channel through the machine.

The parallel ribs are preferably provided on a region of the planar portion which, in use, is not directly in contact with the end windings. This may help to prevent the end windings from drooping into air channels between the ribs. The parallel ribs preferably run in a direction which is substantially perpendicular to a direction of curvature of the curved portion.

While it is desirable to provide circumferential air channels through the separator, it is also desirable to ensure that wires from adjacent windings cannot slip into the channels, since this might compromise the electrical separation. Thus at least some of the ribs may run in a direction substantially perpendicular to that of the windings. The perpendicular ribs are preferably provided on a region of the planar portion which, in use, is in contact with the end windings. The perpendicular ribs preferably provide electrical separation between adjacent windings.

Some or all of the ribs may comprise slots at one or more locations along their length. The slots may provide additional air flow through the separator, and/or provide the separator with additional flexibility, for example to allow it to fit to the curvature of the windings and/or to flex during insertion onto the windings.

The planar portion may have an end which is chamfered. This may facilitate insertion of the separator onto the end windings, by helping to urge apart adjacent end windings. Similarly, the planar portions may have at least one side which is chamfered. This may facilitate circumferential insertion of the separator onto an end winding.

The curved portion may be arranged to provide lacing support. For example, parts of the curved portion between adjacent air holes may be used to provide support for lacing string or tape. This can allow the end windings of the stator to be bound together using lacing string or tape.

In one embodiment, the separator comprises two planar portions connected by the curved portion. This arrangement can facilitate retention of the separator on the windings and help to provide the required electrical separation. The second planar portion may have some or all of the features of the first planar portion.

In this embodiment the curved portion preferably acts as a hinge. In particular, the curved portion may provide the flexibility to allow the separator to be inserted onto the end windings, while the planar portions may provide the required electrical separation between adjacent end windings and/or air channels through the windings. The curved portion may have a cross section which is substantially semi-circular, although other shapes are possible.

In this embodiment the separator may be arranged at least partially to surround a group of end windings. This can help to ensure that the separator remains in place on the end windings, and that it provides the appropriate electrical separation between adjacent end windings.

The curved portion may be curved through an angle of greater than 180°. Furthermore, the planar portions may be angled towards each other as they extend away from the curved portion. These features can allow the separator at least partially to wrap around the end windings.

The planar portions may have ends which define an opening. The opening may be used to help ease the separator over the windings. The distance between the planar portions at the opening is preferably less than a distance between the planar portions at a part of the clip away from the opening, in order to help with retention of the separator on the windings.

Preferably the ends of the planar portions can be pushed apart, for example through the action of pushing the separator onto the windings. This may facilitate insertion of the separator onto the windings.

Alternatively it may be possible for the two ends to touch, in which case the two ends may be opened either manually or by other means during insertion of the separator onto the windings.

Preferably the separator returns to its original shape on removal of a force pushing the ends apart. This can allow the separator to close around the windings, thus helping to ensure that the separator remains in place. Preferably the separator is arranged to grip the end windings, thereby helping to ensure that it remains in place.

The curved portion may be flexible. This may allow the separator to open partially during insertion of the separator onto the windings. Furthermore, the separator may spring back into shape around the windings following insertion.

The curved portion may comprise slots, which may reduce the stiffness of the curved portion and help it to achieve the required spring motion.

Preferably the separator is substantially C-shaped in cross section. For example, the separator may have an elongated C-shaped cross section. This can allow the separator at least partially to surround a group of end windings, thus helping to ensure that it remains in place and provides the necessary electrical separation.

In the above embodiment the separator is preferably in the form of a clip. This can allow the separator to be clipped onto the end windings and held in place.

According to another aspect of the present invention, there is provided a separator for separating end windings in the stator of an electrical machine, wherein the separator is in the form of a clip arranged to be placed around the end windings, the separator comprising a plurality of air holes.

In another embodiment of the invention the separator comprises a single planar portion. This can allow the separator to be used in areas where it would not be possible to clip the separator over windings, such as at the bush region of a stator. In this embodiment, the curved portion may be curved through an angle of greater than 30° or 45° or 60° or 75° and/or less than 150° or 135° or 120° or 105°, or through an angle of approximately 90°.

In any of the above embodiments the separator may be arranged to separate end windings of different phases and/or at different electrical potentials.

The separator may be formed from an electrically-insulating material, such as high density plastic or any other suitable material. The separator is preferably resiliently deformable.

As well as assisting with cooling, the air holes and/or air channels in the separator may provide resin drainage paths. This may facilitate resin drainage post stator impregnation.

According to another aspect of the present invention there is provided a stator for an electrical machine, the stator comprising a plurality of groups of end windings and a separator in any of the forms described above. The stator may be multi-phase, and the separator may be arranged to separate groups of end windings of different phases.

The air holes in the planar portion may provide cooling of the end windings. At least some of the ribs may define circumferential air channels which provide cooling of the end windings.

According to another aspect of the present invention there is provided a method of providing electrical separation between groups of end windings of different phases in a stator of an electrical machine, the method comprising inserting a separator between groups of end windings, wherein the separator provides circumferential air channels through the windings.

According to another aspect of the present invention there is provided a method of providing electrical separation between groups of end windings in the stator of an electrical machine, the method comprising inserting a separator between groups of end windings, the separator comprising a planar portion and a curved portion, wherein the planar portion comprises a plurality of ribs and a plurality of air holes therebetween.

Features of one aspect may be applied to any of the other aspects. Any of the apparatus features may be provided as method features and vice versa.

Preferred features of the present invention will now be described, purely by way of example, with reference to the accompanying drawings, in which:

FIG. 1 shows a separator 10 according to an embodiment of the invention. The separator is designed to be attached to a group of end windings in the stator of a multi-phase electrical machine, in order to provide electrical separation between the phases.

Figure 1:
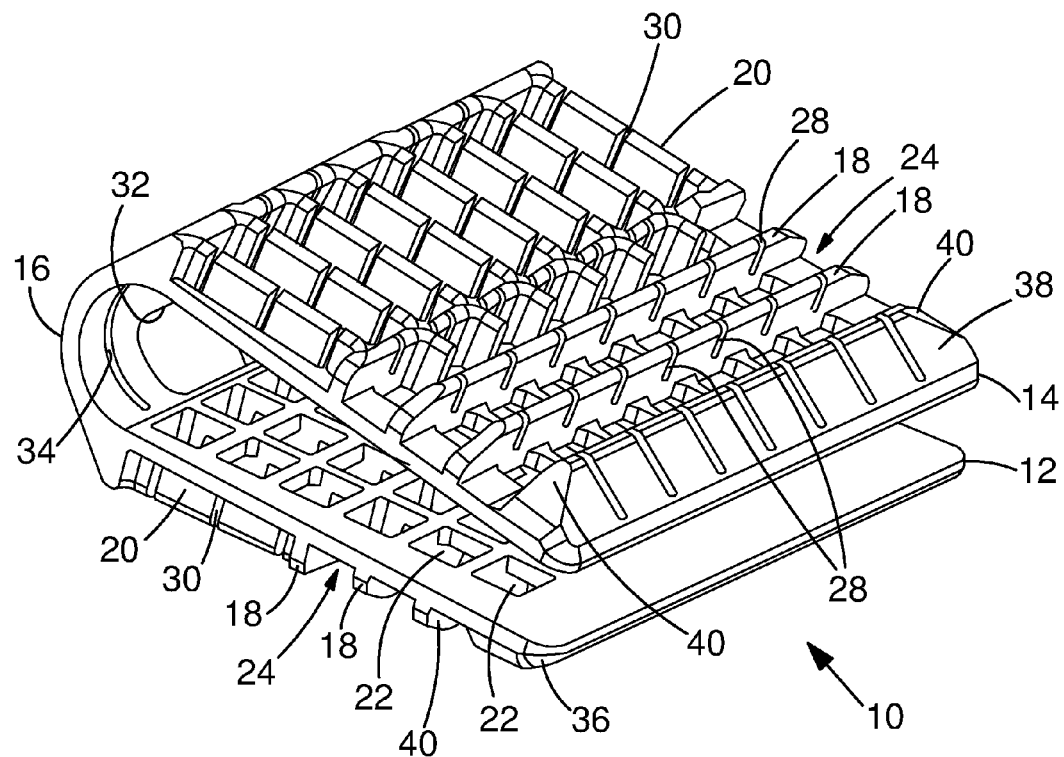
FIG. 1 shows a separator in one embodiment of the invention.

Referring to FIG. 1, the separator 10 comprises two substantially planar portions 12, 14 connected by a curved hinge portion 16. Each of the planar portions 12, 14 has a substantially flat inner surface, and a number of ribs 18, 20 on its outer surface. A plurality of holes 22 is provided in a grid pattern through the planar portions 12, 14.

Figure 2:
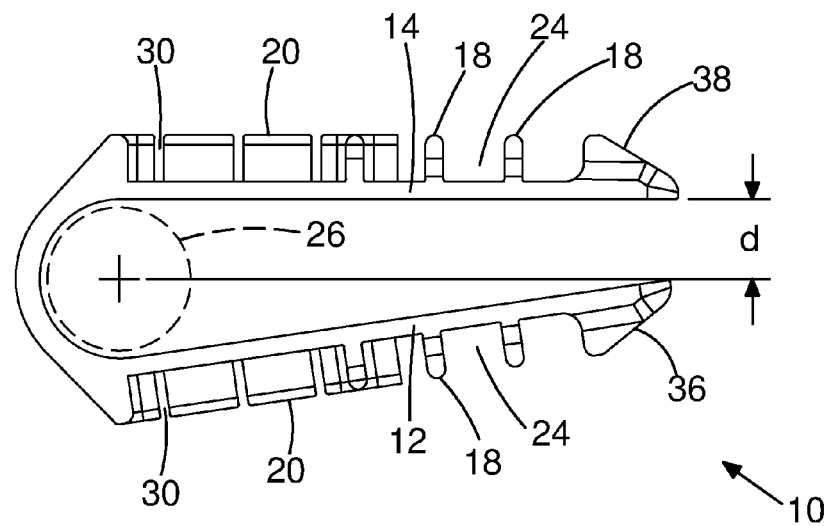
FIG. 2 shows a side view of the separator of FIG. 1.

FIG. 2 shows a side view of the separator 10. Referring to FIG. 2, the planar portions 12, 14 in combination with the hinge portion 16 have an elongated C-shape in cross-section. The hinge portion 16 is curved through an angle of greater than 180°, so that the two planar portions 12, 14 are angled towards each other as they extend away from the hinge portion 16. As a consequence, the planar portions 12, 14 are separated at their open ends by a distance d which is less than a distance between the planar portions inside the separator.

The hinge portion 16 and/or the planar portions 12, 14 have a certain degree of flexibility, such that the ends of the planar portions 12, 14 can be urged apart and then spring back into shape.

In use, the separator 10 is slid over a group of end windings during assembly of the electrical machine. As the separator is first pushed onto the end windings, the open ends of the planar portions 12, 14 are urged apart, thus increasing the distance d. Once the separator has slid over the end windings, the open ends of the planar portions spring back to their original position. The approximate location of a group of end windings once the separator is in place is indicated by the dashed line 26 in FIG. 2.

The distance d between the open ends of the planar portions is chosen to be smaller than the diameter of the group of end windings. By contrast, the distance between the planar portions 12, 14 inside the separator close to the hinge portion 16 is chosen to be approximately equal to or slightly greater than the diameter of the group of end windings. This provides the separator with a self-gripping feature, and allows the separator to secure itself to the end windings without the need for separate securing means.

Referring to FIGS. 1 and 2, each of the planar portions 12, 14 is provided with an entry chamfer 36, 38 at its open end. The end entry chamfers 36, 38 facilitate insertion of the separator onto the end windings, by urging adjacent end windings apart. The end entry chamfers 36, 38 also facilitate axial locking of the separator in the windings by means of friction between the contact surfaces of the winding wires and the faces of the entry chamfers 36, 38. The end entry chamfers 36, 38 also help to ease the removal of any winding insertion tooling bars.

The separator 10 also includes entry chamfers 40 on the sides of the planar portions 12, 14. The side entry chamfers 40 facilitate the circumferential insertion of the separator onto the end windings.

During operation of the machine, the holes 22 act as radial ducts and facilitate convection heat transfer through the end winding conductors by exposing them to air. This in turn allows conduction heat transfer from the stator core to the end windings, and hence contributes to cooling of the stator.

Referring to FIGS. 1 and 2, the separator 10 comprises a plurality of ribs 18 on the outside of the planar portions 12, 14. The ribs 18 run in a direction which is substantially parallel to that of the end windings, that is to say, a substantially circumferential direction when the separator is in place on the end windings of a stator. The ribs 18 define a plurality of cooling channels 24. In operation of the machine, the cooling channels 24 allow circumferential air flow between the end windings, and thus contribute to cooling of the machine.

In a rotating electrical machine, air may either flow naturally through the machine or be forced through with a fan. By providing cooling channels which allow circumferential air flow between the end windings, it is possible for air to be delivered to the inner parts of the windings. Since the inner parts of the windings would not otherwise be exposed to air, and may experience the highest temperatures, this can allow the cooling of the windings to be improved. Furthermore, since an increased area of the windings is exposed to air, the windings may be cooled more consistently so that low temperature differentials are experienced.

In the arrangement of FIGS. 1 and 2, the parallel ribs 18 are not provided across the whole of the planar members but are restricted to parts of the separator which are away from the location of the end windings. Thus the ribs 18 do not come into direct contact with the end windings. This prevents the end windings from falling into the channels, which could otherwise compromise electrical separation between the phases.

Each of the ribs 18 includes a plurality of slots 28. The slots 28 add flexibility to the ribs, and thus help the separator to accommodate the curvature of the windings as the separator is being inserted onto the end windings. The slots 28 also allow a certain degree of radial air flow through the separator.

The separator also comprises a plurality of ribs 20 which run perpendicular to the direction of the end windings. The ribs 20 are located on the sides of the planar members 12, 14 towards the hinge member 16. The ribs 20 act as wire supports to prevent the wires of adjacent windings from falling into the cooling channels. Thus the ribs 20 help to ensure sufficient electrical separation between the different phases.

Each of the ribs 20 includes a plurality of slots 30 along its length. The slots 30 are provided in order to allow a certain degree of circumferential air flow through the separator. The slots 30 also add a degree of flexibility to the ribs 20, and thus allow the planar members to flex slightly as the separator is being opened. The slots 30 are smaller than the wires used in the windings, in order to prevent the wires from becoming trapped.

Referring to FIG. 1, the separator also comprises air holes 32 in the hinge portion 16. The holes 32 facilitate axial air flow, and allow direct air impingement on the stator end windings.

As well as the air holes 32, the hinge portion 16 also includes flex slots 34. The flex slots 34 reduce the stiffness of the hinge portion, and thus help to achieve the required spring motion of the separator.

Following insertion of the separator, the end windings of the stator may be bound together using lacing string. The curved parts of the hinge portion 16 provide lacing supports, which support the lacing string while lacing the end windings. Protrusions on hinge portion 16 retain the lacing string in position. This guides the lace and thus helps to ensure consistency of lacing geometry, as well as consistent tension in the lace.

The separator 10 may be constructed from any suitable material having the necessary physical and electrical properties. It is desirable for the material to be non-conductive, to have a certain degree of flexibility, while being compressively rigid, and to have good thermal characteristics. It is also desirable for the material to be fairly low-friction, in order to allow the separator to be slid over end windings. In practice, high density plastics have been found to be suitable materials. The separator can be manufactured using injection moulding.

In use, the separator 10 provides electrical insulation between groups of windings in the machine by virtue of the air gaps it enforces between the groups of windings. It is necessary for the air gap between two groups of windings to be large enough for its electrical breakdown strength to be greater than any anticipated potential difference between the groups of windings. However it is also desirable to limit the thickness of the separator, in order to avoid adding unnecessarily to the bulk of the machine. Thus the dimensions of the separator are a trade-off between these different factors.

For a typical machine, a breakdown voltage of 15 kV between two adjacent groups of windings might be desired, which corresponds to the breakdown voltage of a typical sheet of composite meta-aramid material. An equivalent breakdown voltage can be achieved with a separator which provides an air gap of approximately 5 mm. However these values will of course depend on the machine for which the separator is designed.

Figure 3:
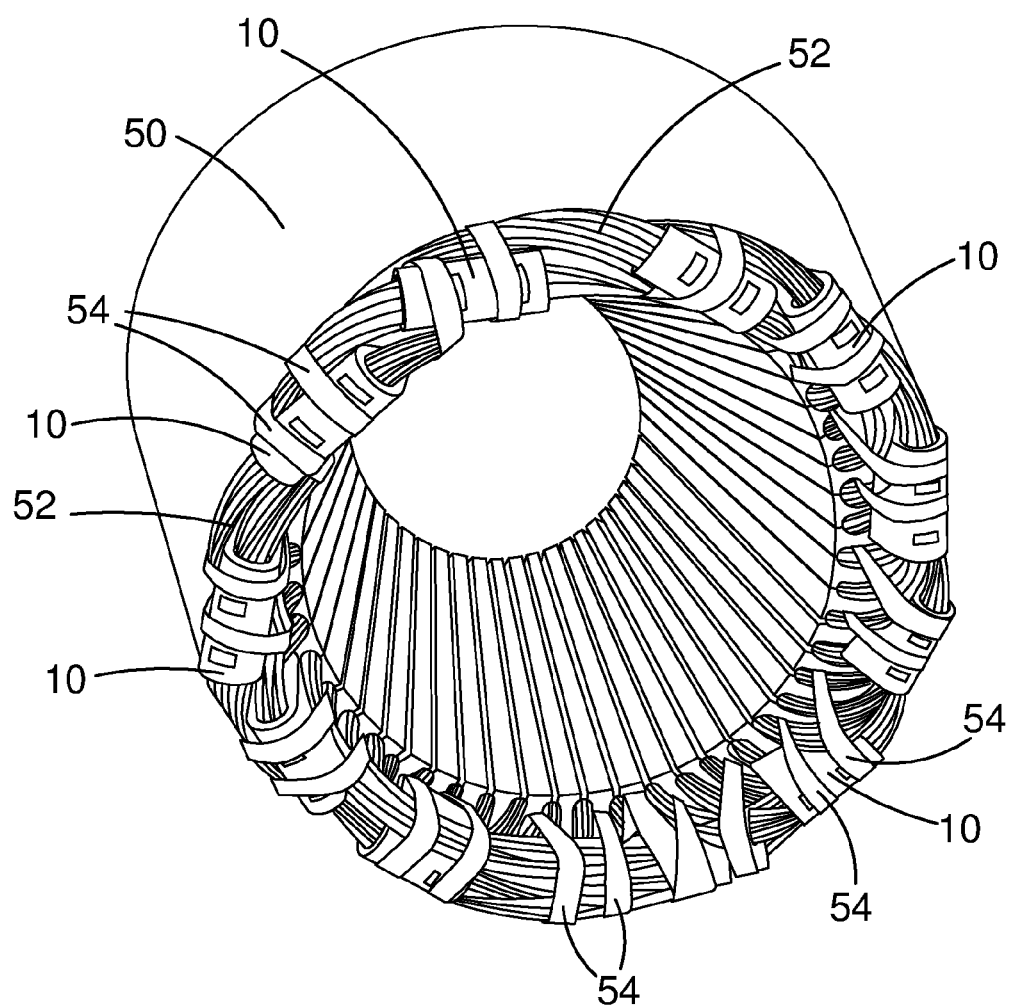
FIG. 3 shows a view of a stator of an electrical machine.

FIG. 3 shows a view of a stator of an electrical machine with a plurality of separators in place on the end windings. The stator of FIG. 3 is for use with a rotating electrical machine in which a rotor is accommodated inside the stator.

Referring to FIG. 3, the machine comprises an annular stator core 50 with stator slots for accommodating stator windings. The stator windings run through the slots and exit the stator core to form end windings 52. The end windings run in a substantially circumferential direction around the machine.

In the arrangement of FIG. 3, a group of windings is provided for each phase and each pole. Thus the windings within a group are at the same voltage, while the windings in an adjacent group are typically at a different voltage. A separator 10 is located around each group of end windings 52. The separators provide electrical separation between the phases as well as air channels through the end windings in the ways described above. In the assembled machine the separators 10 are held in place by means of lacing string 54.

Figure 4:
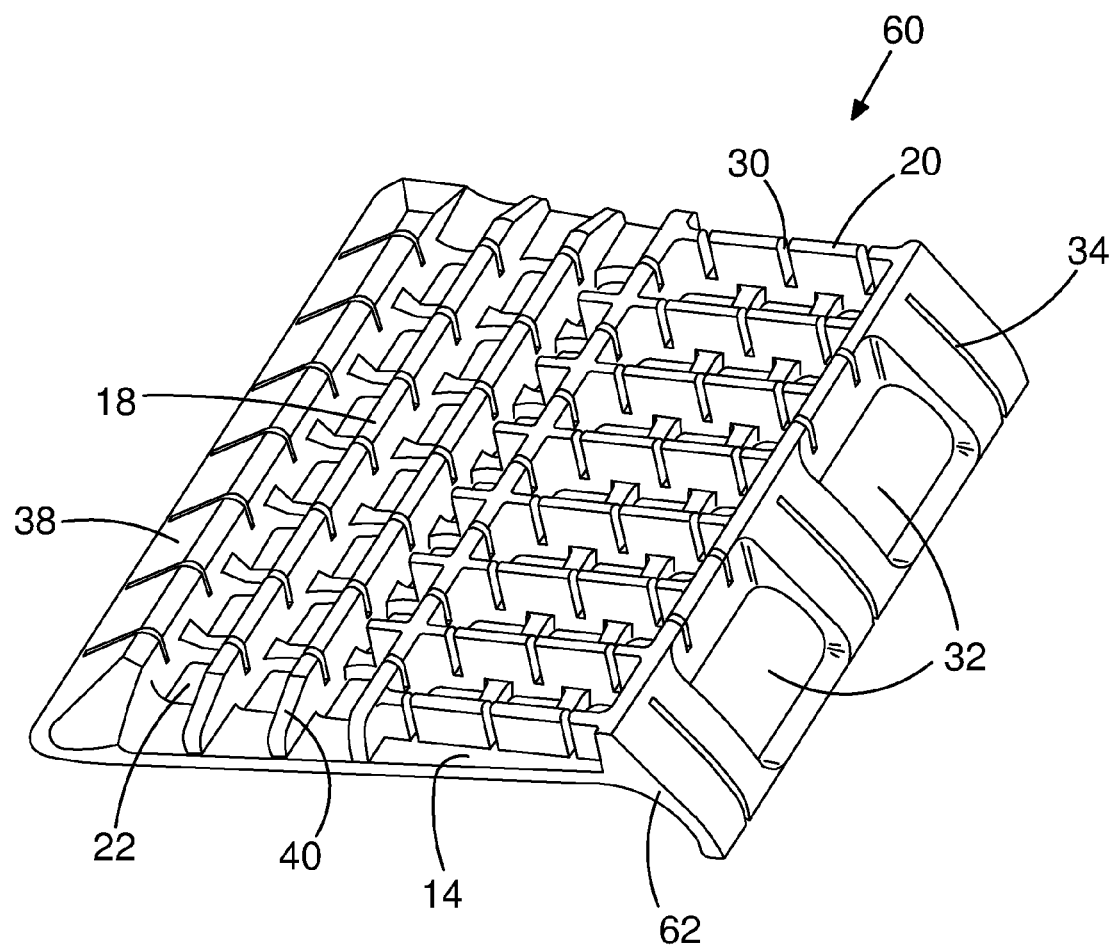
FIG. 4 shows an alternative embodiment in which the separator is provided in a half clip design.

FIG. 4 shows an alternative embodiment in which a separator 60 is provided in a half clip design. The separator 60 comprises a single planar portion 14, and a curved portion 62 which corresponds to half of a hinge portion 16 in FIGS. 1 and 2. Features of FIG. 4 which correspond to those of FIGS. 1 and 2 are given the same reference numerals, and are not described further. This arrangement can be used to separate end windings at the bush region of the stator.

Figure 5:
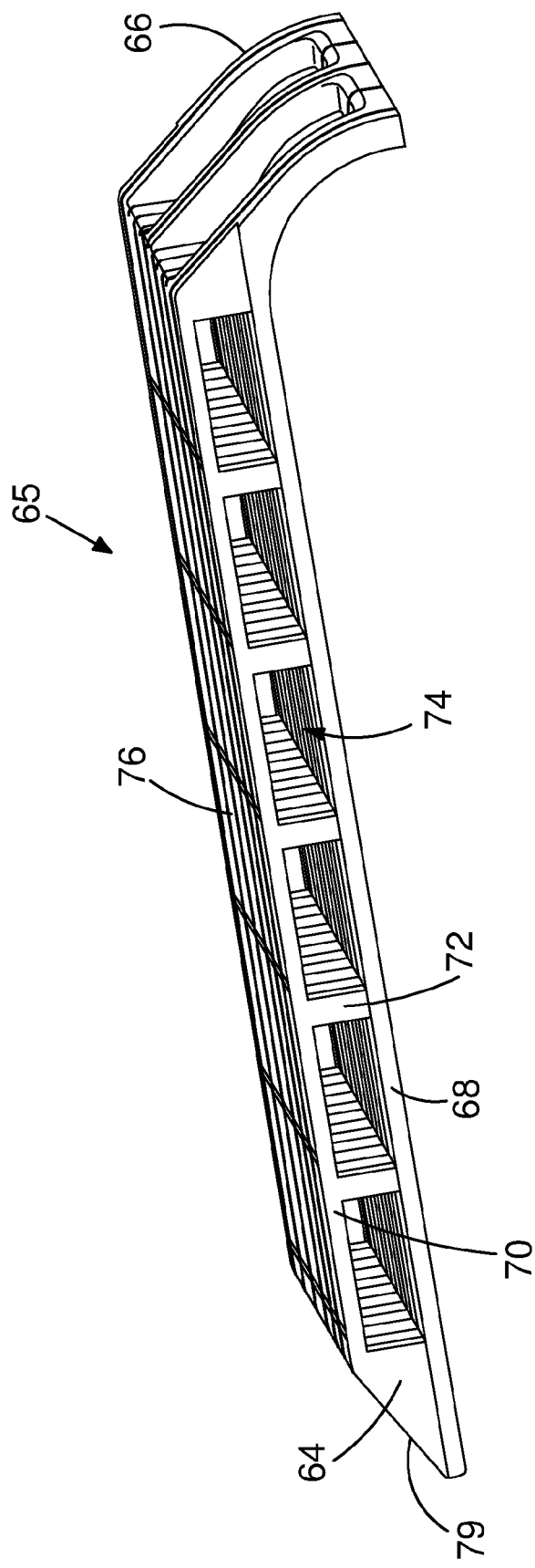
FIGS. 5 and 6 show a separator in another embodiment of the invention.

FIG. 5 is a side view of a separator 65 in another embodiment of the invention. Referring to FIG. 5, the separator comprises a planar member 64 and a curved portion 66, in a similar way to the embodiment of FIG. 4. However in the embodiment of FIG. 5, the planar member 64 comprises a bottom layer 68 and a top layer 70 which are separated by ribs 72. The ribs 72 run in a direction which is substantially parallel to that of the end windings when the separator is in place, in a similar way to the ribs 18 of FIGS. 1, 2 and 4. Thus the ribs 72 define a plurality of cooling channels 74 which run in a substantially circumferential direction through the windings.

In the arrangement of FIG. 5, circumferential cooling channels 74 are provided across the whole of the planar member 64. This can help to ensure consistent air flow through the inner layers of the windings, and thus help to achieve effective cooling of the windings.

In the arrangement of FIG. 5, the top layer 70 comprises beams 76 which run substantially perpendicular to the direction of the end windings. The beams 76 act as wire supports to prevent the wires of adjacent windings from falling into the cooling channels. Thus the beams 76 help to ensure that there is a sufficient air gap between adjacent groups of windings, and thus that there is sufficient electrical separation between the different phases.

Figure 6:
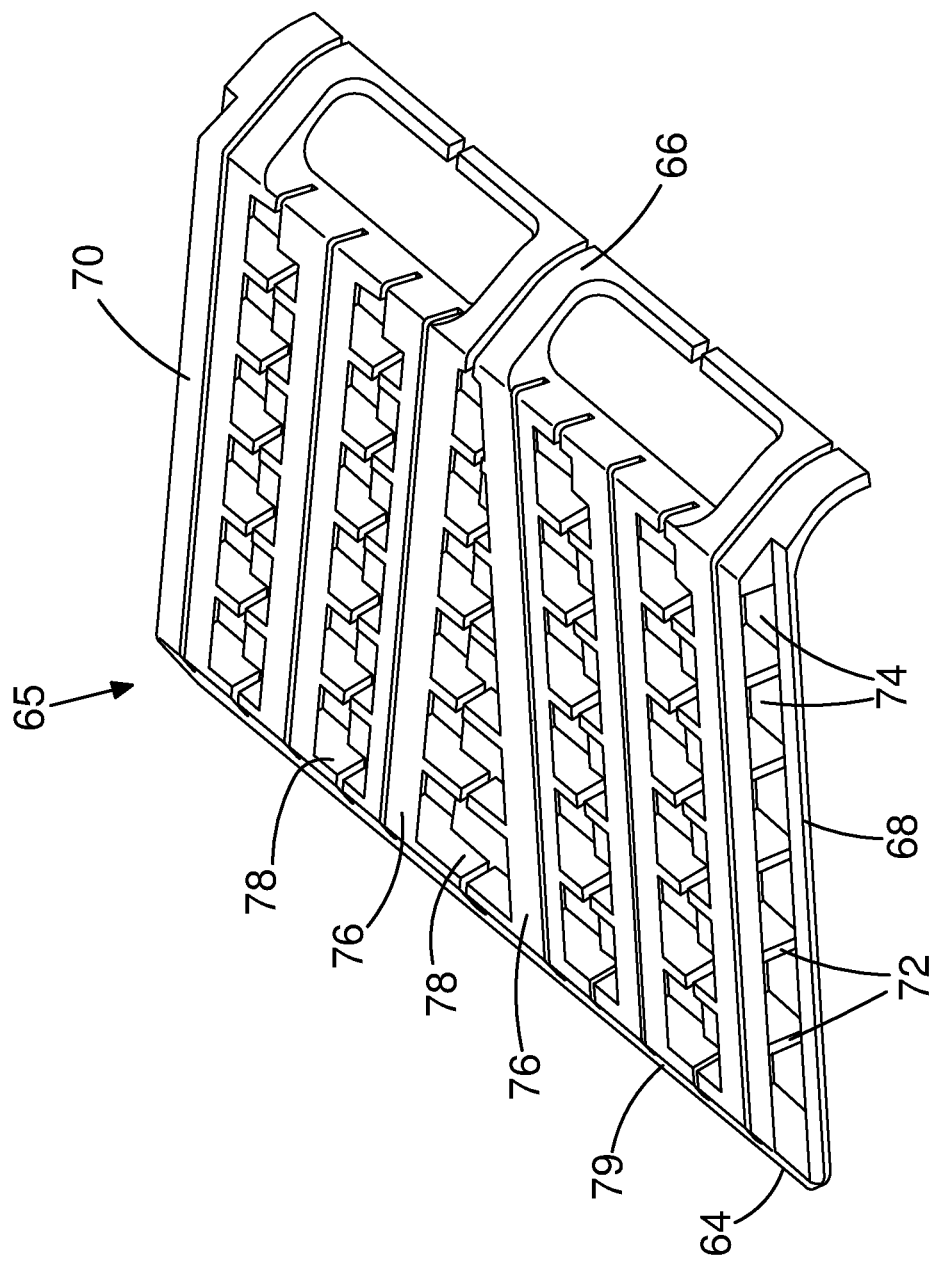

FIG. 6 shows a top view of the separator 65 in the embodiment of FIG. 5. Referring to FIG. 6, it can be seen that the ribs 72 and the beams 76 define a plurality of holes 78. During operation of the machine, the holes 78 act as radial ducts and allow air to flow radially through the windings, in a similar way to the holes 22 of FIGS. 1 and 4. Furthermore, the holes 78 allow circumferential air flow through the cooling channels 74 to reach the insides of the windings.

In the arrangement of FIGS. 5 and 6, the beams 76 are designed to be wide enough to prevent any significant drooping of the windings into the holes 78. However it is also desirable for the holes 78 to be as large as possible in order to increase the amount of air flow. Thus the widths of the beams 76 are chosen to be a trade-off between these two factors.

The separator of FIGS. 5 and 6 is also provided with an entry chamfer 79 to facilitate insertion of the separator into the end windings, in a similar way to the entry chamfer 36, 38 of FIGS. 1, 2 and 4.

As in the previous embodiments, the separator of FIGS. 5 and 6 provides electrical separation between groups of windings in the machine by virtue of the air gaps it creates between the groups of windings. It is necessary for the separator to be sufficiently thick to provide the required electrical breakdown strength, while avoiding unnecessary thickness which would add to the bulk of the machine. It is also necessary for the bottom layer 68 and the top layer 70 to be sufficiently thick to physically support the windings, while avoiding unnecessarily limiting the size of the air channels 74. For a typical machine, the separator may have a total thickness of about 5 mm, and the top layer and bottom layer may each have a thickness of about 1 mm. Of course it will be appreciated that any of these values may be varied to suit the requirements of the machine in question.

Figure 7:
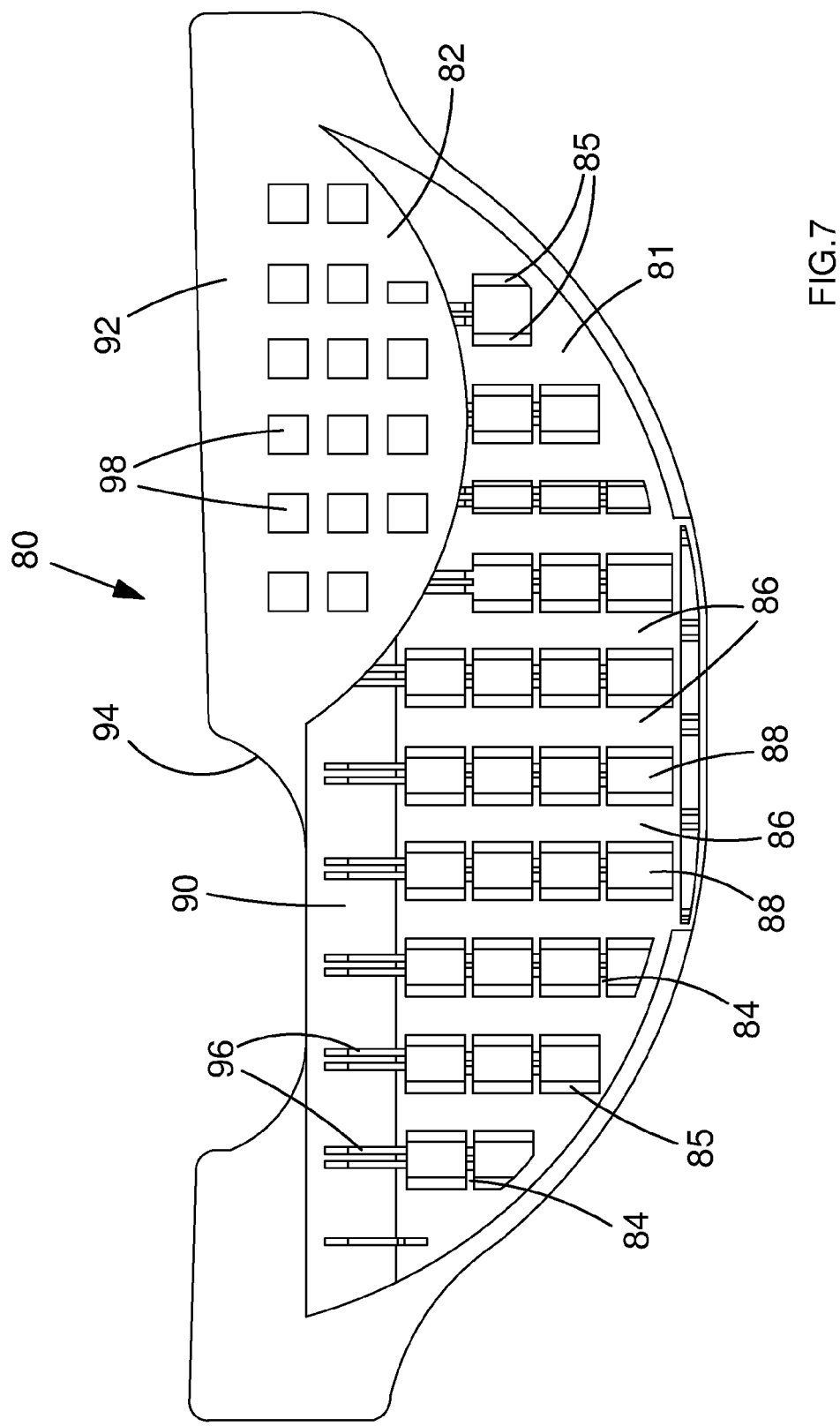
FIG. 7 shows a separator in another embodiment of the invention.

FIG. 7 shows a separator 80 according to another embodiment of the invention. The separator of this embodiment is substantially planar, although it may have a slight curvature in order to fit between groups of windings.

The separator of FIG. 7 comprises a top layer 81 and a bottom layer 82 separated by an air gap. The top layer 81 is designed to lie against a group of windings, while the bottom layer 82 is designed to lie against another, adjacent group of windings. The top layer 81 and bottom layer 82 are held apart by a plurality of ribs 84. The ribs 84 define a plurality of circumferential air channels 85 which run through the plane of the separator.

The top layer 81 comprises a series of beams 86 which run in a direction substantially perpendicular to the ribs. The bottom layer 82 comprises a series of beams 88 which are also perpendicular to the ribs 84, and which run parallel to the beams 86 in the top layer. The beams in each layer are spaced apart, so that an opening is present between adjacent beams in each layer. A sloping portion 90 is provided, which slopes between the top layer 81 and the bottom layer 82. The separator also has an area 92 in which there is no top layer, and the bottom layer is exposed from above. A cut-out area 94 is also provided.

Figure 8:
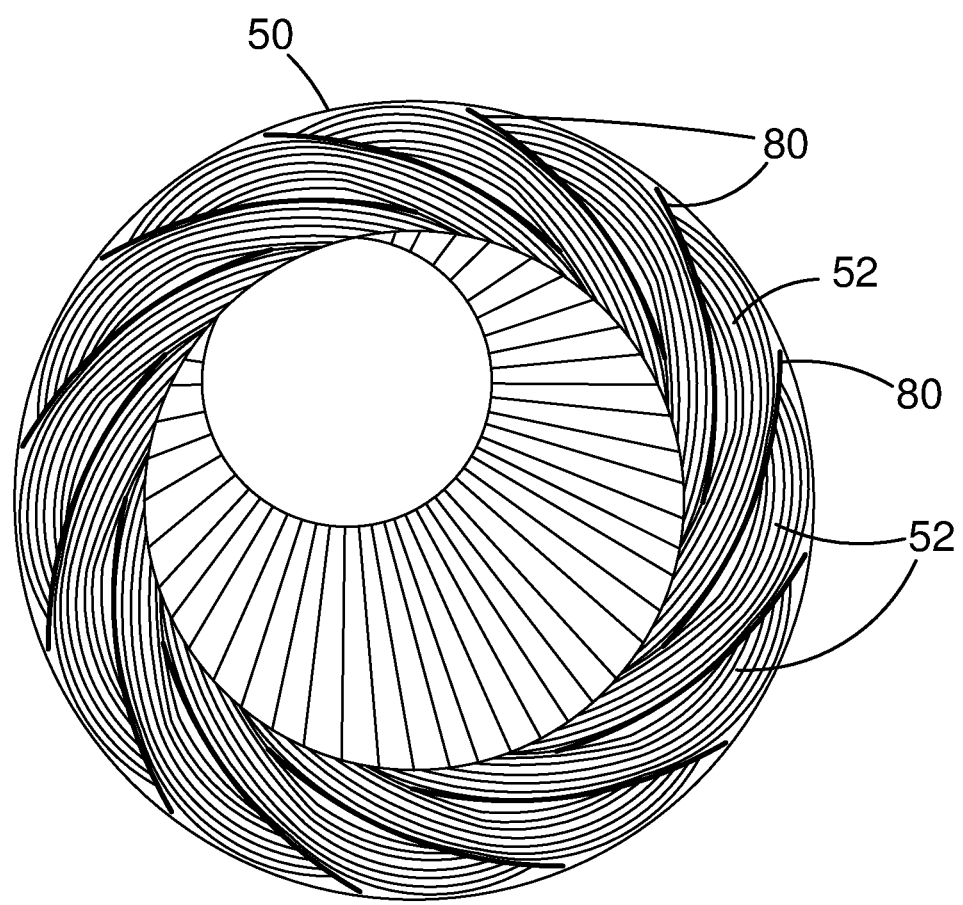
FIG. 8 shows schematically a stator of a rotating electrical machine incorporating a plurality of separators according to the embodiment of FIG. 7.

FIG. 8 shows schematically a stator of a rotating electrical machine incorporating a plurality of separators in the embodiment of FIG. 7. Referring to FIG. 8, the machine comprises an annular stator core 50 with end windings 52. A group of end windings is provided for each phase and each pole. The end windings run in a substantially circumferential direction around the machine. A separator 80 is located between adjacent groups of end windings 52. As can be seen from FIG. 8, the separators fan out, and partially overlap in a radial direction.

In the arrangement of FIG. 8, each separator 80 extends along substantially the whole length of a group of windings. Thus the separator 80 helps to ensure that sufficient separation is maintained at each point between two adjacent groups of windings. Furthermore, since the separator is in two layers with an air gap in between, it is possible for air to flow circumferentially between the windings along substantially their whole length. This can help to ensure consistent air flow throughout an inner layer of the windings.

Figure 9:
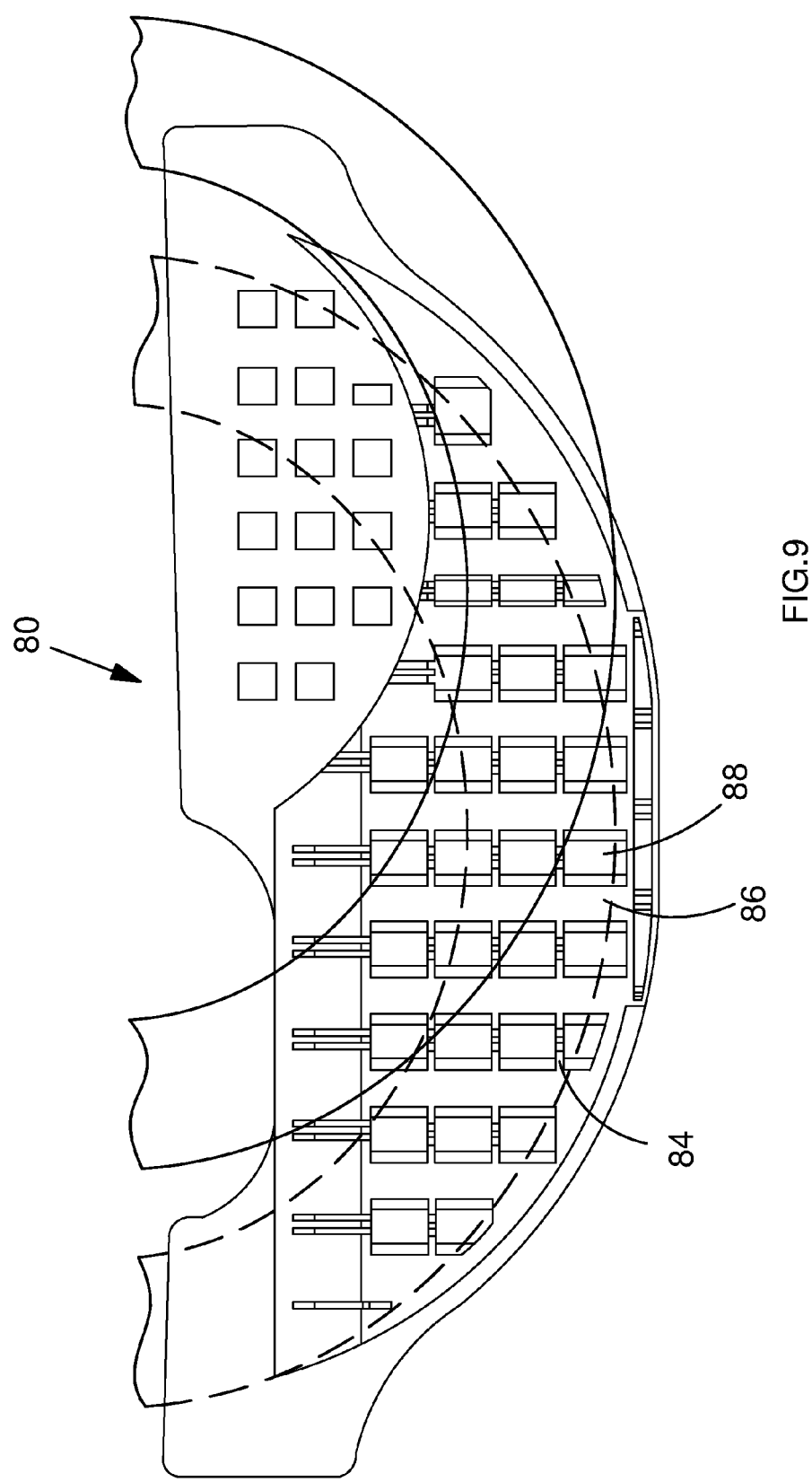
FIG. 9 shows schematically how the separator of FIG. 7 fits between various groups of windings.

FIG. 9 shows schematically how the separator of FIG. 7 fits between two groups of windings. Referring to FIG. 9, the dashed lines indicate a group of windings which sit below the separator 80 and the solid lines indicate a group of windings which sit above the separator. It can be seen that the ribs 84 and the beams 86, 88 are arranged approximately in those areas where electrical separation is required between two adjacent groups of windings.

The exposed area 92 is provided in an area where physical support is required for the windings below the separator, but where there are no windings directly above. The exposed area 92 may also help to keep the separator in place when in use. The exposed area 92 has holes 98, which allow air to flow radially through the separator.

The cut out area 94 is provided in an area where there are no two adjacent groups of windings, and where it is not necessary to provide support for windings.

The sloping portion 90 of the separator is provided in order to facilitate insertion of the separator onto the end windings, by urging adjacent end windings apart. The sloping portion 90 is provided with slots 96. The slots 96 are provided in order to increase the flexibility of the separator, and thus help with insertion of the separator into the windings.

It will be appreciated that the shape of the separator and the various different areas on it may be varied in dependence on the type of electrical machine with which it is to be used, and the winding pattern which is employed.

The separator 80 of FIGS. 7 to 9 provides electrical separation between groups of windings in the machine by virtue of the air gaps it creates between the groups of windings. It is necessary for the separator to be sufficiently thick to provide the required electrical breakdown strength, while avoiding unnecessary thickness which would add to the bulk of the machine. For a typical machine, the separator may have a total thickness of about 5 mm, providing a breakdown voltage of about 15 kV, although these values may be varied depending on the requirements for the machine in question.

Referring back to FIGS. 7 and 9, the ribs 84 run in a direction which is substantially parallel to that of the end windings when the separator is in place, in a similar way to the ribs 18 of FIGS. 1, 2 and 4 and the ribs 72 of FIGS. 5 and 6. Thus the ribs 84 define a plurality of cooling channels 85 which run in a substantially circumferential direction through the windings. This can ensure that air flow is directed to areas where adjacent windings overlap, which is the area where the highest temperatures might otherwise be experienced. Furthermore, the circumferential air channels 85 help to ensure that air flow is evenly distributed over the windings.

In the arrangement of FIGS. 7 and 9, the beams 86 in the top layer 81 are staggered with respect to the beams 88 in the bottom layer 82. Thus, viewed from above, the separator comprises alternately an upper beam 86 and a lower beam 88. In this arrangement, the width of each of the beams 86, 88 is slightly less than the distance between two adjacent beams in the opposite layer, and thus small gaps 85 are present between the beams. However the width of the beams may also be the same as or slightly greater than the distance between two adjacent beams in the opposite layer.

The staggered nature of the beams may provide at least the following advantages:

For the majority of the separator, there is always either an upper beam 86 or a lower beam 88 between two groups of windings. Thus it is virtually impossible for the windings to press through the separator and to contact another group of windings. This helps to ensure that the required electrical separator between groups of windings is maintained.

Radial air flow through the separator is achieved by virtue of the staggered air paths through the upper beams 86 and the lower beams 88. This allows heat transfer from the stator core to the end windings, and hence contributes to the cooling of the windings.

Circumferential air flow through the separator between the upper beams 86 and the lower beams 88 can reach the insides of the windings though the gaps between adjacent beams in each layer.

When the separator is in use, contaminants such as dirt, pollution, salt and water on the surface of the separator could potentially create a conductive path across it. For this reason, it is desirable to maximise the length of the surface from one side of the separator to the other, called the creepage distance. The staggered nature of the beams increases the creepage distance of the separator, thereby reducing the chances of an electrical path being created between two groups of windings.

In the arrangement of FIGS. 7 to 9, the top beams 86 and bottom beams 88 should be sufficiently thick to physically support the windings, while avoiding unnecessarily limiting the size of the air gap between them. For a typical machine, the separator may have a total thickness of about 5 mm, and the top beams 86 and bottom beams 88 may each have a thickness of about 1 mm. Of course it will be appreciated that any of these values may be varied to suit the requirements of the machine in question.

Figure 10:
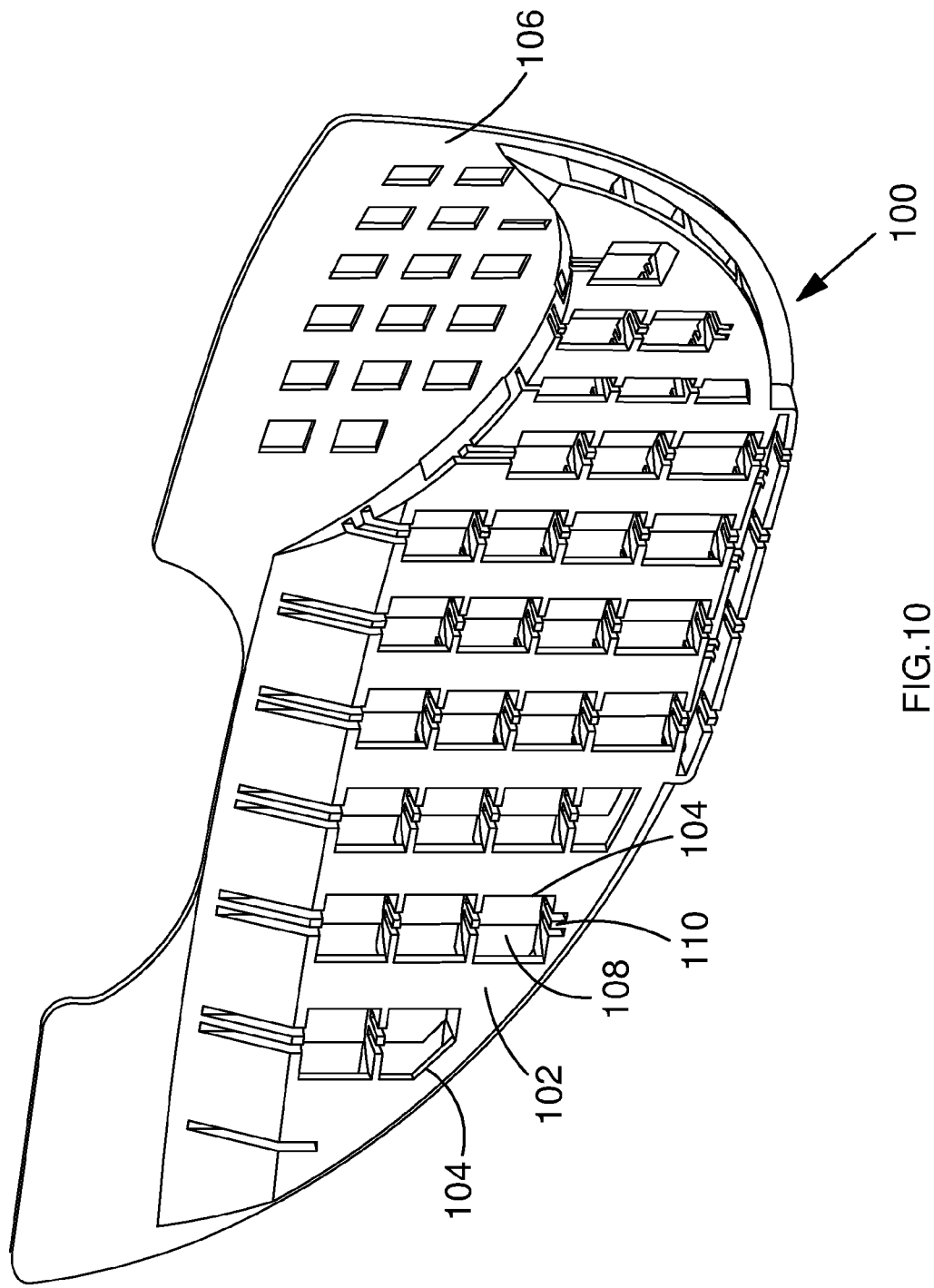
FIG. 10 shows a separator in another embodiment of the invention.

FIG. 10 shows a three dimensional view from below of a separator 100 in another embodiment. The separator of FIG. 10 is similar to that of FIG. 7. However, in the separator of FIG. 10, the top layer 102 comprises a number of holes arranged in a grid pattern, while the bottom layer 106 comprises a number of isolated beams 108, each of which is located beneath a hole 104 in the top layer. Thus, in the arrangement of FIG. 10, parts of the top layer are staggered with respect to parts of the bottom layer, as in the arrangement of FIG. 7.

In the arrangement of FIG. 10, the beams 108 are supported by posts 110. The posts 110 sit back from the edges of the beams 108. This arrangement increases the creepage distance of the separator, thereby reducing the chances of an electrical path being created between two groups of windings. For example, in the arrangement of FIG. 10, the creepage distance may be approximately 20 mm, at least for the majority of the separator.

Other features of the embodiment of FIG. 10 are the same as or similar to that of FIG. 7, and thus are not described further.

In all of the above embodiments, once the stator has been wound it may be impregnated with resin, in order to provide further insulation and mechanical stability. The air holes and the air channels in the separator can provide resin drainage paths, thereby facilitating resin drainage post stator impregnation.

While preferred features of the invention have been described with reference to specific embodiments, it will be appreciated that variations are possible within the scope of the invention. For example, the exact dimensions and shape of the separator, as well as the position, size and location of holes and air channels, may vary in dependence on the machine with which the separator is to be used and the winding pattern employed. Furthermore, features of one embodiment may be provided in combination with features of any of the other embodiments.

The invention claimed is:

1. A separator configured to sit between two groups of end windings in a stator of a rotating electrical machine and to electrically separate the two groups of end windings, the separator comprising a substantially planar layer and a plurality of upright elements, wherein the upright elements protrude out of a plane of the substantially planar layer and define a plurality of circumferential air channels through the groups of end windings.

2. A separator according to claim 1, wherein at least a portion of the separator is substantially planar, and the circumferential air channels are arranged in the plane of the separator.

3. A separator according to claim 1, wherein the plurality of upright elements function to hold apart adjacent groups of windings.

4. A separator according to claim 1, wherein the separator comprises at least one opening between the circumferential air channel and the windings.

5. A separator according to claim 1, wherein the separator is arranged to allow radial air flow through the windings.

6. A separator according to claim 1, wherein the separator is arranged to extend along substantially a length of a group of windings.

7. A separator according to claim 1, wherein the separator comprises a top layer and a bottom layer separated by an air gap.

8. A separator according to claim 7, wherein the circumferential air channels are between the top layer and the bottom layer.

9. A separator according to claim 7, wherein at least one of the top layer and the bottom layer comprises a support arranged to support a group of windings.

10. A separator according to claim 9, wherein the support is arranged to reduce or prevent droop of the windings into the circumferential air channel.

11. A separator according to claim 9, wherein the support comprises a series of planar elements.

12. A separator according to claim 11, wherein an upright element is offset from an edge of a planar element for supporting a group of windings.

13. A separator according to claim 7, wherein parts of the top layer are staggered with respect to parts of the bottom layer.

14. A separator according to claim 7, wherein a part of one of the top layer and bottom layer is located opposite an opening in the other of the top layer and bottom layer.

15. A separator according to claim 7, wherein the plurality of upright elements are arranged to separate the top layer and the bottom layer.

16. A separator according to claim 7, further comprising a sloping portion between the top layer and the bottom layer.

17. A separator according to claim 16, wherein the sloping portion comprises at least one slit.

18. A separator according to claim 1, the separator comprising a cut out area.

19. A separator according to claim 1, the separator comprising a planar portion and a curved portion.

20. A separator according to claim 19, wherein the separator comprises two planar portions connected by the curved portion.

21. A separator according to claim 20, wherein the curved portion acts as a hinge.

22. A separator according to claim 1, wherein the plurality of upright elements are in the form of ribs with a plurality of air holes therebetween.

23. A separator according to claim 22, wherein the ribs define the circumferential air channels.

24. A stator of a rotating electrical machine, the stator comprising a plurality of groups of end windings and a separator which sits between two groups of end windings and which electrically separates the two groups of end windings, the separator comprising a substantially planar layer and a plurality of upright elements, wherein the upright elements protrude out of a plane of the substantially planar layer and define a plurality of circumferential air channels through the groups of end windings.

25. A stator according to claim 24, wherein the stator is multi-phase, and the separator is arranged to separate groups of end windings of different phases.

* * * * *